United States Patent
Pini et al.

(10) Patent No.: US 11,720,564 B2
(45) Date of Patent: Aug. 8, 2023

(54) OPTIMIZATION OF DATABASE SEQUENCE OF JOINS FOR REACHABILITY AND SHORTEST PATH DETERMINATION

(71) Applicant: Sindice Limited, Galway (IE)

(72) Inventors: Daniele Pini, Rome (IT); Giovanni Tumarello, Bergamo (IT); Renaud Delbru, Gradignan (FR)

(73) Assignee: Sindice Limited, Galway (IE)

( * ) Notice: Subject to any disclaimer, the term of this patent is extended or adjusted under 35 U.S.C. 154(b) by 0 days.

(21) Appl. No.: 17/939,525

(22) Filed: Sep. 7, 2022

(65) Prior Publication Data

US 2022/0414098 A1    Dec. 29, 2022

Related U.S. Application Data

(63) Continuation of application No. PCT/EP2021/055929, filed on Mar. 9, 2021.

(30) Foreign Application Priority Data

Mar. 9, 2020 (EP) .................... 20161921

(51) Int. Cl.
*G06F 16/00* (2019.01)
*G06F 16/2453* (2019.01)
(Continued)

(52) U.S. Cl.
CPC .... *G06F 16/24544* (2019.01); *G06F 16/2246* (2019.01); *G06F 16/248* (2019.01); *G06F 16/24552* (2019.01)

(58) Field of Classification Search
CPC ........... G06F 16/24544; G06F 16/2246; G06F 16/24552; G06F 16/248
USPC .................................. 707/600–899
See application file for complete search history.

(56) References Cited

U.S. PATENT DOCUMENTS 11,036,739 B1 * 6/2021 Adams .............. G06F 16/24544
11,262,926 B1 * 3/2022 Animesh ................ G06F 3/061
(Continued)

FOREIGN PATENT DOCUMENTS

EP     2682878 A1    1/2014

OTHER PUBLICATIONS

Jindal Alekh et al: "Graph analytics 1-12 using vertica relational database", 2015 IEEE International Conference on Big Data (Big Data), [Online] Oct. 29, 2015 (Oct. 29, 2015), pp. 1191-1200, XP055812137, DOI: 10.1109/BigData.2015.7363873 ISBN: 978-1-4799-9926-2, Retrieved from the Internet: URL:https://dspace.mit.edu/bitstream/handle/1721.1/111783/Madden_Graph%20analytics.pdf?sequence=1&isAllowed=y> [retrieved on Jun. 9, 2021].

(Continued)

*Primary Examiner* — Michelle N Owyang
(74) *Attorney, Agent, or Firm* — Warner Norcross + Judd LLP (57) ABSTRACT

A method, system and computer program product are disclosed for determining a shortest path between two nodes of a graph, where the graph is represented in one or more tables of a relational database as a plurality of records identifying edges between pairs of connected nodes in the graph. A request specifies a source node (or set of source nodes), a target node (or set of target nodes) and a maximum path length L. Each path length l, from 1 to L, is iteratively tested by first generating a query comprising a sequence of join operations for that path length, and secondly decomposing the join operations into a sequence of one or more tree-structured queries comprising semi-join operations. Each tree-structured query when executed as a sequence of semi-join operations will return either an empty result set, indicating that no shortest path exists at that path length, or a non-empty result set which identifies all edges at step k of (Continued)

each shortest path of length l, where 1≤k≤l. If all of the tree-structured queries for a path length l return non-empty result sets, the shortest paths of length l can be constructed from the result sets with each result set specifying the edges at a particular step along the shortest path.

20 Claims, 7 Drawing Sheets

(51) Int. Cl.
  *G06F 16/22* (2019.01)
  *G06F 16/2455* (2019.01)
  *G06F 16/248* (2019.01)

(56) References Cited

U.S. PATENT DOCUMENTS

| | | | |
|---|---|---|---|
| 2016/0179883 A1* | 6/2016 | Chen | G06F 16/2282 707/741 |
| 2017/0060539 A1* | 3/2017 | Ma | G06F 16/2453 |
| 2018/0046669 A1 | 2/2018 | Peri et al. | |
| 2019/0317965 A1* | 10/2019 | Remis | G06F 16/24578 |
| 2020/0110827 A1* | 4/2020 | Freedman | G06F 16/24542 |
| 2020/0285643 A1* | 9/2020 | Kadiam | G06F 16/24542 |
| 2021/0006459 A1* | 1/2021 | Yeh | G06F 9/547 |

OTHER PUBLICATIONS

Bin Cao et al: "A nested relational approach to processing SQL subqueries", SIGMOD 2005 : Proceedings of the ACM SIGMOD International Conference on Management of Data; Baltimore, Maryland, Jun. 14-16, 2005, Association for Computing Machinery, New York, NY, Jun. 14, 2005 (Jun. 14, 2005).

PCT International Search Report completed Jun. 9, 2021, for International application No. PCT/EP2021/055929.

Multiple-Source Shortest Paths in Planar Graphs, by Philip N. Klein, published Jan. 23, 2005.

* cited by examiner

Fig. 1

Fig. 2
```
SELECT E.target
FROM T as E
WHERE E.source = u
```

Fig. 3
```
SELECT E₁.id, …, E₁.id
FROM T as E₁, …, T as E₁
WHERE
   E₁.source = u AND
   E₁.target = E₂.source AND
   …
   E₁₋₁.target = E₁.source AND
   E₁.target = v
```

Fig. 4

```
                                                        ⌐400
SELECT E₁.id, E₂.id, E₃.id
FROM T as E₁, T as E₂, T as E₃
WHERE
   E₁.source = u AND
   E₁.target = E₂.source AND
   E₂.target = E₃.source AND
   E₃.target = v
```

Fig. 5

```
                                                        ⌐500
SELECT E₁.id
FROM T as E₁
WHERE
   E₁.source = u AND
   EXISTS (
      SELECT *
      FROM T as E₂
      WHERE
         E₁.target = E₂.source AND
         EXISTS (
            SELECT *
            FROM T as E₃
            WHERE
               E₂.target = E₃.source AND
               E₃.target = v
         )
   )
```

Fig. 6

```
                                              ╭─600
    SELECT E2.id
    FROM T as E2
    WHERE
        EXISTS (
          SELECT *
          FROM T as E1
          WHERE
             E1.source = u AND
             E1.target = E2.source
        )
        AND
        EXISTS (
          SELECT *
          FROM T as E3
          WHERE
             E2.target = E3.source AND
             E3.target = v
        )
```

Fig. 7

```
                                              ╭─700
    SELECT E3.id
    FROM T as E3
    WHERE
       E3.target = v AND
       EXISTS (
          SELECT *
          FROM T as E2
          WHERE
             E3.source = E2.target AND
             EXISTS (
                SELECT *
                FROM T as E1
                WHERE
                   E2.source = E1.target AND
                   E1.target = u
             )
       )
```

Fig. 8

```
                                          ┌800
801
802 ─PROJECT(E1.id)
803    |-JOIN(E1.target = E2.source)
804        |-FILTER(E1.source = u)
805            |-SCAN(E1)
806        |-JOIN(E2.target = E3.source)
807            |-SCAN(E2)
808            |-FILTER(E3.target = v)
                   |-SCAN(E3)
```

Fig. 9

```
                                          ┌900
        PROJECT(E2.id)
901        |-INTERSECT
               |-JOIN(E2.source = E1.target)
                   |-SCAN(E2)
                   |-FILTER(E1.source = u)
902                    |-SCAN(E1)
               |-JOIN(E2.target = E3.source)
                   |-SCAN(E2)
                   |-FILTER(E3.target = v)
                       |-SCAN(E3)
```

Fig. 10

```
                                          ┌1000
1001   PROJECT(E3.id)
          |-JOIN(E3.source = E2.target)
              |-FILTER(E3.target = v)
                  |-SCAN(E3)
1002          |-JOIN(E2.source = E1.target)
                  |-SCAN(E2)
                  |-FILTER(E1.source = u)
                      |-SCAN(E1)
```

```
                                            ╭1100
            PROJECT(E1.id)                 /
Fig. 11      |-JOIN(E1.target = E2.source)
               |-FILTER(E1.source = u)
                 |-SCAN(E1)
               |-JOIN(E2.target = E3.source)
    1101         |-SCAN(E2)
                 |-JOIN(E2.target = E3.source)
                   |-SCAN(E3)
                   |-FILTER(E4.target = v)
                     |-SCAN(E4)
```

OPTIMIZATION OF DATABASE SEQUENCE OF JOINS FOR REACHABILITY AND SHORTEST PATH DETERMINATION

TECHNICAL FIELD

The present invention relates to processing reachability and shortest path operations on graph-structured data in a relational database.

BACKGROUND ART

Many critical scenarios depend on the analysis of graph-structured data, such as data relating to network event logs, financial transactions, call detail records, and social networks, for various purposes. These purposes can range from the identification of network attack, to the detection of fraud and money laundering, the tracing of crimes and the detection of organized crime rings.

Graph analytics has led the development of numerous graph algorithms such as reachability, shortest path, PageRank or Connected-Component to name a few. In addition, many new algorithms and specialized distributed graph processing systems have been designed to support the analysis of massive graphs.

However, graph-structured data are often stored in relational databases and it is not always practicable to import massive datasets from a relational database to a specialized graph processing system. It is therefore desirable to design algorithms based on relational query model and SQL to solve graph analytics at scale.

Data stored in a relational database is organized in a plurality of tables, where each table is associated with a different record type. Each row of a table represents a record, while each column of a table represents an attribute and a value assigned to the record. In addition, each row is associated with a unique key that allows the row to be linked to rows in other tables.

A user or a program may retrieve data from a relational database by sending a query. A query may include one or more relational query operators such as the select, project, union, intersection and join, to name a few. In response to a query, the database may return a result set which includes a list of rows.

A query may be written using a specialized language, such as SQL. SQL is a standardized language for querying structured and relational data and it is supported by many modern relational database systems. While we are using SQL queries in this disclosure, these are used as examples to assist in the understanding of the disclosure. Instead, one should think in terms of relational query operators.

A relational graph model can be defined as follows. Let G(V,E) be a directed graph with $V=\{v_1, \ldots, v_{|V|}\}$ the set of nodes or vertices and E the set of edges, where $e_{ij} \in E$ represents a directed edge from the source node $v_i$ to the target node $v_j$. Such a graph model may be mapped to one or more tables T. Each record $r \in T$ may be mapped to a directed edge $e_{ij} \in E$. The source and target nodes of the edge $e_{ij}$ may be mapped to two attributes, s and t respectively, of a record r. The notation r[s], resp. r[t], refers to a value associated with the attribute s, resp. t, of the record r. Such a value may be mapped to a node v in the graph, or in other words an attribute value may refer to a unique identifier of a node v.

Figure 1:
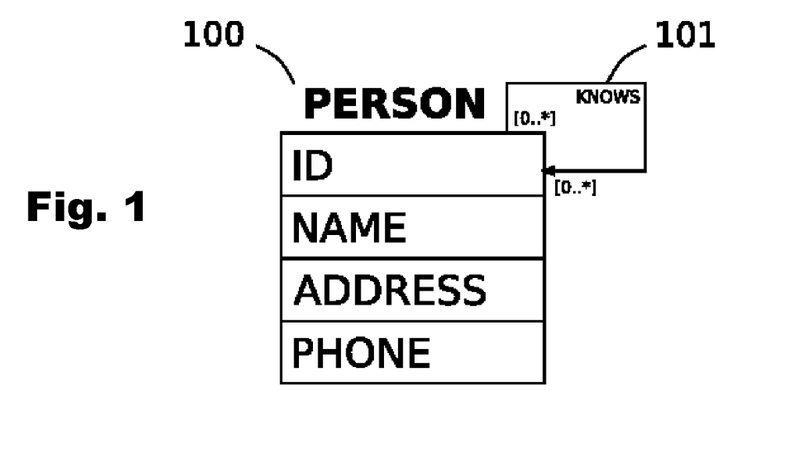
FIG. 1 is a diagram depicting the schema of a database table.

For example, FIG. 1 depicts the schema of a database table PERSON 100 storing information about people, such as their name, address, phone number and social network. Each record is identified with an attribute PERSON.ID holding a unique identifier. A record may be related to zero or more records through the attribute PERSON.KNOWS 101. This database schema may be mapped to a graph model in which a directed edge $e_{ij} \in E$ represents a relationship between two person records. The source and target nodes of the edge $e_{ij}$ may be mapped to two attributes, PERSON.ID and PERSON.KNOWS respectively.

It will be clear to a person skilled in the art that the relational graph model may be extended to various scenarios. In one embodiment, the set of edges may be mapped to records from more than one table where each table corresponds to a different record type. In another embodiment, a record attribute may be multi-valued, something quite common in document-oriented databases. Such a record with a multi-valued attribute may be expanded to multiple records with a single-valued attribute. In another embodiment, a node may be mapped to at least two record attributes in case of a compound identifier. In another embodiment, other attributes of a record may be used to filter out specific nodes and edges.

The Shortest Path Problem

The reachability operation can be formally defined as follows. A node $u \in V$ reaches another node $v \in V$ if there exists at least one path p of finite length between the two nodes. A path p is an ordered list of edges $[e_{u,k1}, e_{k1,k2}, \ldots, e_{kn,v}]$. The single-pair shortest path problem can be defined as follows. Given two nodes $u \in V$ and $v \in V$, a shortest path between u and v is a path between u and v having the minimum possible length. The objective is to find all the possible shortest paths between u and v. The many-to-many shortest path problem can be defined as follows. Given two set of nodes $V_1 \subseteq V$ and $V_2$ $V_1 \subseteq V$, the objective is to find all the possible shortest paths between every pair of nodes $u \in V_1$, $v \in V_2$ in the graph.

The reachability and shortest path operations that are outlined in this disclosure are bounded with a maximum path length, denoted by L.

There exist three common approaches to solve the reachability and the shortest path problems using standard SQL: the Breadth-First Search (BFS), an explicit sequence of joins, and SQL extensions using stored procedures.

BFS

The BFS approach to a shortest-path problem is well known in computer algorithm theory. In a relational database, one may implement a client-side BFS algorithm that uses SQL queries to lookup neighbor nodes.

Figure 2:
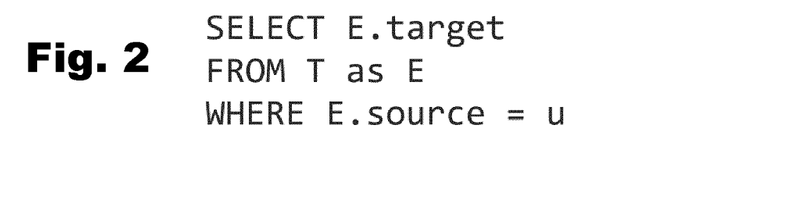
FIG. 2 is a SQL query for a Breadth-First Search.

Referring to the code snippet in FIG. 2, starting from a source node u, the neighbor nodes of the source node u are retrieved by executing an SQL query. The neighbor nodes are added to a queue of unvisited nodes and may be associated with the parent node for backtracking purpose. Next, an unvisited node is retrieved from the queue and a similar procedure is applied. The algorithm stops when the maximum path length L is reached, when there are no more nodes to explore destination node, or when the destination node is found. It is understood that even when the destination node is found, the remaining unvisited nodes must also be visited to ensure that all the shortest paths are found. It should be apparent how this algorithm may be extended for the many-to-many scenarios.

This approach does not scale well on large graphs. The number of queries to execute may become very large since one query is executed per visited node. Given an average branching factor (or out-degree) b, the time complexity is $O(b^L)$ with L being the maximum path length. The size complexity is linear with the number of edges |E| as each visited node is associated with its parent nodes.

Sequence of Joins

Figure 3:
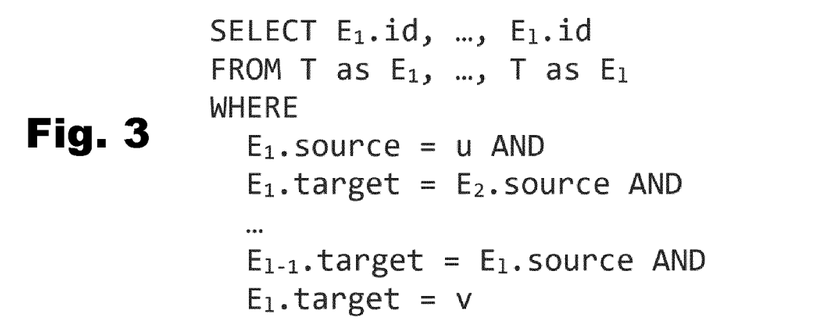
FIG. 3 is a SQL query for a sequence of joins.

Another popular technique is to generate explicitly a sequence of joins for every path length starting from a length of 1 up to the maximum length L. Given a path length l<=L, a source node u and a target node v, a sequence of l−1 joins is executed as shown in FIG. 3. The result set is a relation which consists in a list of the shortest paths of length l. The algorithm stops when the maximum path length L is reached or when one of the queries returns a non-empty result set.

Compared to the BFS approach, this approach reduces the number of queries that are executed to the number of path lengths tested and pushes down the filtering of invalid paths to the database engine. However, this approach does not scale well on large graphs as the intermediate and final result sets grow exponentially with the branching factor and the path length. Given an average branching factor b, the size complexity is $O(b^L)$ with L being the maximum path length. The exponential size of the intermediate and final result sets makes the use of a caching mechanism impracticable.

SQL Procedural Extension

This approach uses a procedural SQL extension to implement an iterative graph algorithm such as BFS or Dijkstra. For example, the FEM framework extends SQL with three operators, to select frontier nodes, expand frontier nodes and merge expanded nodes. They use temporary tables as data structures to store and maintain visited nodes. These algorithms can be extended to find all the shortest paths. The size complexity of the temporary table is linear with the number of edges |E| as each visited node is associated with its parent nodes. The time complexity is $O(b^L)$ if a BFS algorithm is used. A drawback of these approaches is that this may add a significant I/O load on the database to write and maintain the temporary tables. Also, these approaches may be non-trivial to implement and may require database-specific extensions.

Due to the shortcomings and in particular the scalability problems associated with the known approaches, there is a need to develop alternative techniques to solve the reachability and shortest path problems.

DISCLOSURE OF THE INVENTION

In accordance with the invention there is provided a method for performing an operation on a relational database comprising a plurality of records represented in one or more tables, to return a set of paths from a source node identified in one of said records to a target node identified in another of said records, with records of the database identifying edges between pairs of connected nodes, and wherein each of the returned path is a shortest path through said records from the source node to the target node, the method comprising:

a. receiving a request specifying a source node u, a target node v, and a maximum path length L;
b. iteratively testing each path length l from 1 to L, wherein testing a path length l comprises:
  i. generating a query comprising a sequence of join operations for the path length l which connect the source node u to the target node v;
  ii. generating a sequence of one or more tree-structured queries comprising semi-join operations of said database, said sequence of tree-structured queries representing a decomposition of said sequence of join operations;
  iii. executing the semi-join operations of each tree-structured query for the path length l, wherein each tree-structured query returns either an empty result set or a non-empty result set, a non-empty result set comprising a set of edges representing a path through the database records from the source node u to the target node v;
  iv. in the event that any of the tree-structured queries for the path length l returns an empty result set, terminating the execution of semi-join operations for the path length l and advancing the iteration to the next path length l+1;
  v. in the event that all of the tree-structured queries for the path length l return non-empty result sets, terminating the iterative testing procedure and storing the non-empty result sets for the path length l; and
c. returning the shortest path(s) specified in the or each stored result set for the path length l at which the iterative testing terminated;
wherein step (iii) of executing the semi-join operations of each tree-structured query for the path length l comprises determining, for a semi-join operation of the tree-structured query, whether the result of that semi-join operation is stored in a cache from a preceding tree-structured query for the path length l or from a tree-structured query from a preceding path length k where 1≤k≤l, and:
  if the determination is positive, retrieving the result from the cache without repeating the semi-join operation; or
  if the determination is negative, performing the semi-join operation and storing the result thereof in said cache.

The decomposition of the join operations for a given path length l into a sequence of tree-structured queries comprising semi-join operations enables the problem to be more efficiently solved, in particular for massive datasets and as the maximum path length increases.

The iterative testing procedure can quickly identify the non-existence of any shortest path at length l, if one of the tree-structured queries for that path length l returns an empty result set, as this indicates that no edge forming part of a shortest path exists at one of the steps k where 1≤k≤l. If all of the tree-structured queries return non-empty result sets, then the iterative testing can be terminated and the shortest paths of length l can be constructed from those result sets, with each result set specifying the edges of shortest paths at a given step from 1 to l.

Preferably, the method further comprises returning a null result if the iterative testing of all path lengths from 1 to L generate a non-empty result set.

In some embodiments, said request specifies a plurality of source nodes and/or a plurality of target nodes, and steps (b) and (c) are repeated by generating a query comprising a sequence of join operations between a plurality of source nodes and a plurality of target nodes.

Preferably, the step of generating a sequence of one or more tree-structured queries comprising semi-join operations comprises:

a. generating a permutation of the projected variable representing edges $E_k$ at position k in the ordered list of edges $E_1, \ldots, E_l$ of paths of length l; and
b. rewriting the query to compute every list of edges $E_1, \ldots, E_l$.

Preferably, the results of a tree-structured query is a set of all edges $E_k$ at step k of each shortest path of length l where 1≤k≤l.

Preferably, where all of the tree-structured queries for a path length l return non-empty result sets, each of the non-empty result sets represents all of the edges at a particular step along each of the shortest paths of length l.

Preferably, results stored in the cache are stored as result sets indexed using an identifier derived from the signature of the semi-join operation.

Preferably, results stored in the cache are encoded by storing row identifiers of edges in the set of results in a bit array, permitting a look-up operation to retrieve row identifiers of the edges forming the result set for a given semi-join operation.

Preferably, the cache is maintained across successive iterations of increasing path length, such that the results of a semi-join operation computed as a decomposition of a first sequence of join operations of path length l1 are retrieved during a later iteration of path length l2, where l2>l1.

Preferably, the method further comprises the step of generating a query plan for each tree-structured query, the query plan specifying the tree-structured query as a combination of semi-join operations and cached result retrievals.

There is also provided a computer program product comprising instructions which when executed in a processor of a computing system are effective to cause said system to perform the methods disclosed herein.

There is further provided a system for performing an operation on a relational database comprising a plurality of records represented in one or more tables, to return a set of paths from a source node identified in one of said records to a target node identified in another of said records, with records of the database identifying edges between pairs of connected nodes, and wherein each of the returned path is a shortest path through said records from the source node to the target node, the system comprising a processor programmed to:
  a. receive a request specifying a source node u, a target node v, and a maximum path length L;
  b. iteratively test each path length l from 1 to L, wherein testing a path length l comprises:
    i. generating a query comprising a sequence of join operations for the path length l which connect the source node u to the target node v;
    ii. generating a sequence of one or more tree-structured queries comprising semi-join operations of said database, said sequence of tree-structured queries representing a decomposition of said sequence of join operations;
    iii. executing the semi-join operations of each tree-structured query for the path length l, wherein each tree-structured query returns either an empty result set or a non-empty result set, a non-empty result set comprising a set of edges representing a path through the database records from the source node u to the target node v;
    iv. in the event that any of the tree-structured queries for the path length l returns an empty result set, terminating the execution of semi-join operations for the path length l and advancing the iteration to the next path length l+1;
    v. in the event that all of the tree-structured queries for the path length l return non-empty result sets, terminating the iterative testing procedure and storing the non-empty result sets for the path length l; and
  c. return the shortest path(s) specified in the or each stored result set for the path length l at which the iterative testing terminated;
  wherein step (iii) of executing the semi-join operations of each tree-structured query for the path length l comprises determining, for a semi-join operation of the tree-structured query, whether the result of that semi-join operation is stored in a cache from a preceding tree-structured query for the path length l or from a tree-structured query from a preceding path length k where 1≤k≤l, and:
    if the determination is positive, retrieving the result from the cache without repeating the semi-join operation; or
    if the determination is negative, performing the semi-join operation and storing the result thereof in said cache.

BRIEF DESCRIPTION OF THE DRAWINGS

The invention will now be illustrated by the following description of embodiments thereof, given by way of example only, with reference to the accompanying drawings, in which.

DETAILED DESCRIPTION OF PREFERRED EMBODIMENTS

The following embodiments describe the implementation of a method of finding a shortest path (or all shortest paths) in a relation database, illustrated using a SQL example. However it will be appreciated that the concepts disclosed herein are applicable in any other relational database environment that uses the semi-join operation.

A semi-join is commonly used as a basic relational operation in query processing, especially in distributed environment as the semi-join operation is generally much cheaper to compute than inner-join operations.

A semi-join is a binary operator taking two data tables as inputs, called the left and right input tables, and producing one data table as output. The input data table may be a physical table stored on disk or in memory, or an intermediate table created by the database to store temporary data that are used to calculate the final result set (e.g., the table output of another query operator).

A semi-join is similar to a regular join, except that only records from the left data table are kept based on match condition with the right data table. The output of a semi-join is a data table composed of one or more records and one or more columns from the left data table.

In addition, semi-join operations may be cached very efficiently given the nature of their results set, which is a list of row identifiers, compared to inner-join operations.

For simplicity the description of the technique will focus on finding all possible paths for the single-pair shortest path problem. It will be clear for a person skilled in the art how to extend the technique to the many-to-many shortest path problem by using a set of nodes instead of a single node as source and target.

The technique described here is similar to the technique based on sequence of joins described previously. Given a maximum path length L, each path length l<L is incrementally tested by executing a query consisting of a sequence of n=(l−1) joins. The iteration is stopped when the maximum path length L is reached or when one of the queries returns a non-empty result set.

The difference is that a sequence of (l−1) joins for a given path length l is decomposed into a sequence of l tree-structured queries $[Q_1, \ldots, Q_l]$, each one consisting of (l−1) semi-joins. The result set of a tree-structured query $Q_k$ is a set of edges $E_k$. An edge $e \in E_k$ belongs to at least one shortest path p and corresponds to the edge at the position k in the ordered list of edges $[e_1, \ldots, e_l]$. A permutation of the projected variable of the query is performed and the query rewritten as appropriate to compute every list of edges $[E_1, \ldots, E_l]$. The projected variable is the variable associated to the edge we are seeking to project, such as $E_1$, $E_2, \ldots E_l$.

Each tree-structured query $Q_k$ computes a set of edges $E_k$ at once. A set of edges $E_k$ represents all the edges of step k of all the possible shortest paths. If an empty result set is returned by any one of the tree-structured queries for a given path length l, this means that there is not a shortest path at this path length, and so the testing of the tree-structured queries for this path length can be terminated and the next path length can be examined for existence of a shortest path.

If there is a path at a given path length l, then each of the queries will return a non-empty result set indicating at least one edge forms part of a shortest path at each step from 1 to l. Therefore, once all the tree-structured queries have successfully returned a non-empty result set, these result sets together show all of the shortest paths existing at that path length.

By iteratively testing each path length from 1 to L, where L is the maximum specified path length, one can terminate the iterative testing when all of the tree-structured queries for a given path length successfully return a non-empty result set, and conversely as soon as one of the tree-structured queries at a given path length returns an empty set the iteration can be advanced to the next path length.

Figure 4:
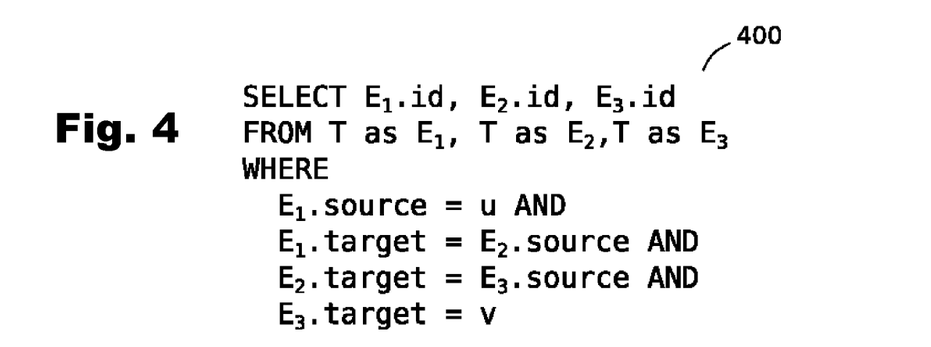
FIG. 4 is a SQL query for a sequence of joins for a path length of 3.
Figure 5:
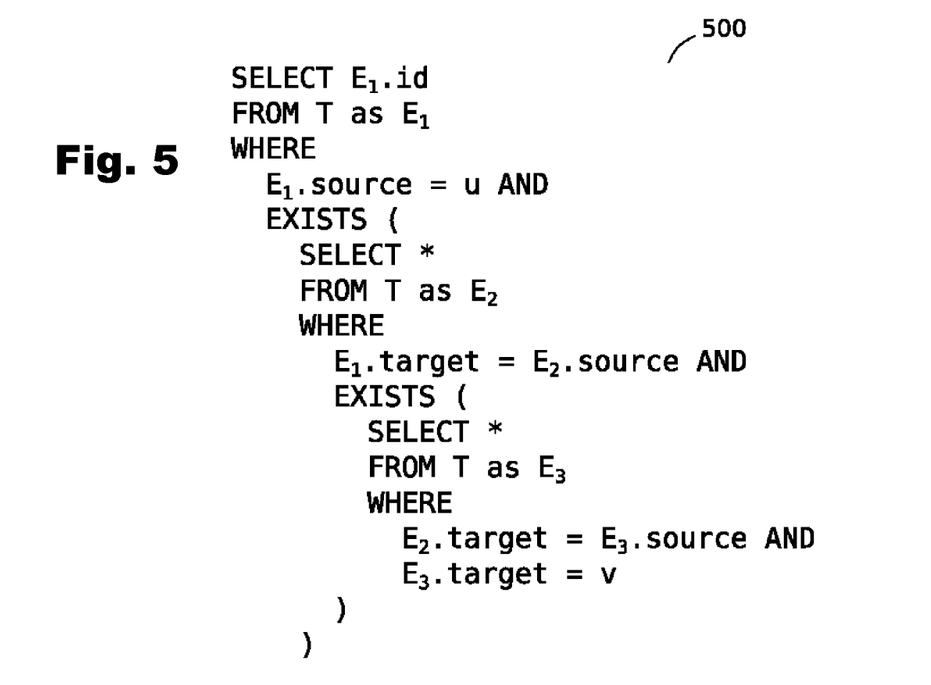
FIG. 5 is a SQL query for a first semi-join decomposition for a sequence of joins for a path length of 3.
Figure 6:
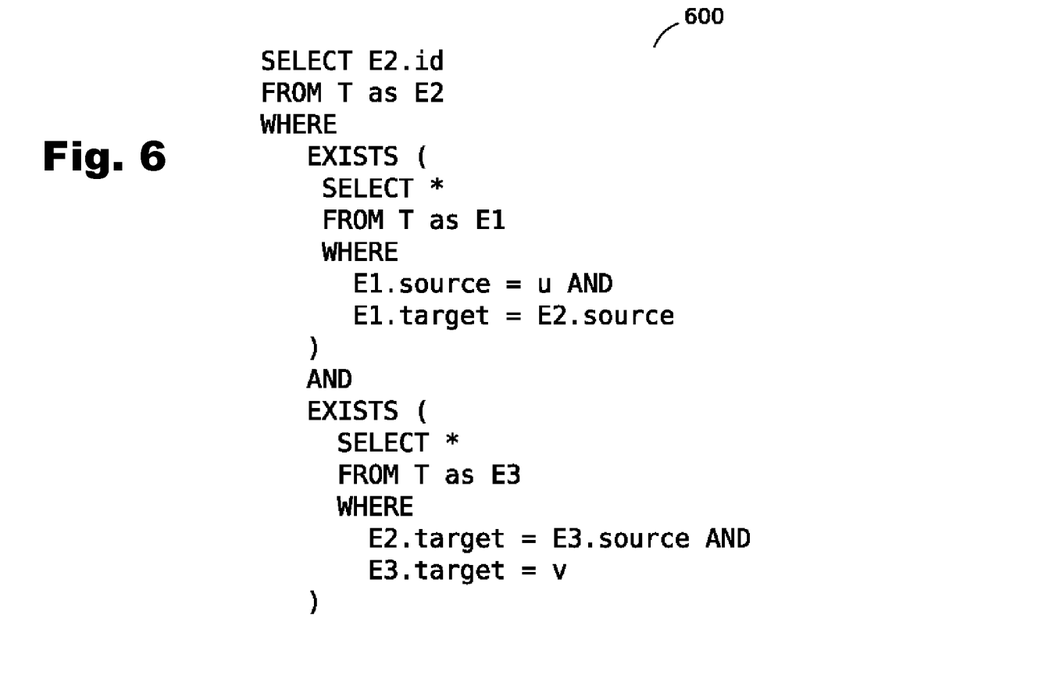
FIG. 6 is a SQL query for a second semi-join decomposition for a sequence of joins for a path length of 3.
Figure 7:
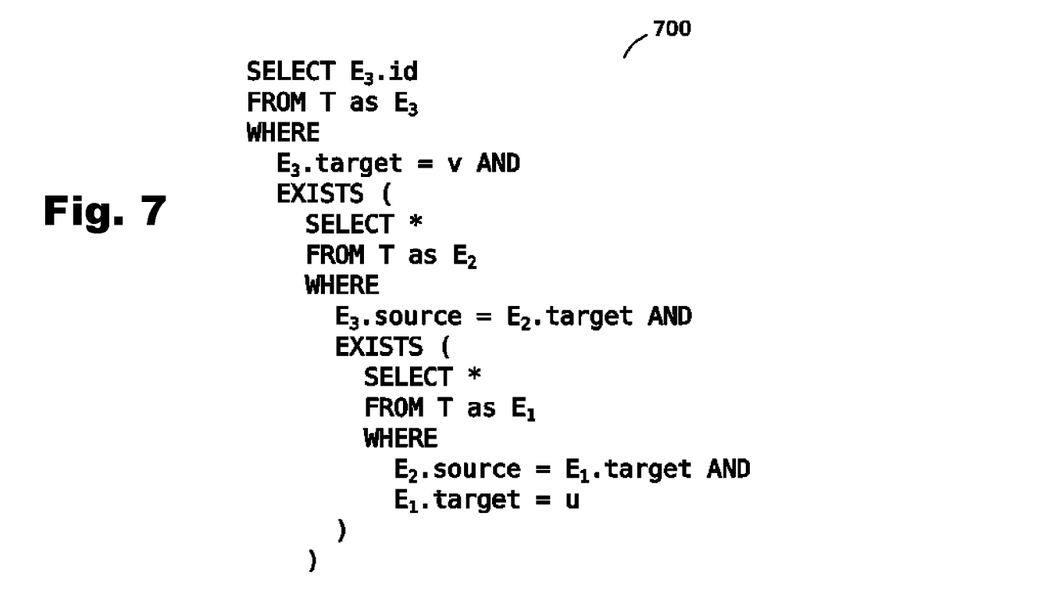
FIG. 7 is a SQL query for a third semi-join decomposition for a sequence of joins for a path length of 3.

For example, FIG. 4 illustrates the sequence of joins for a path length of 3. This sequence of joins can be decomposed into a sequence of three tree-structured queries $[Q_1, Q_2, Q_3]$ in which each tree-structured query consists in a sequence of semi-join operations. The three-structured queries $Q_1, Q_2, Q_3$ are illustrated in FIGS. 5, 6 and 7 respectively, each of which is one of the three permutations when the projected variable is a different edge, while in FIGS. 8, 9 and 10 (discussed further below) the projected variable is the variable defined in the Project operation.

The result set of a tree-structured query $Q_k$ consists in a set of records, where each record r may be mapped to an edge $e \in E_k$. The queries $Q_1$, $Q_2$ and $Q_3$ produce the set of edges $E_1$, $E_2$ and $E_3$ respectively.

The sequence of tree-structured queries is executed sequentially, one tree-structured query at a time. The first tree-structured query is used as an initial reachability test. If the first tree-structured query returns an empty result set, there is no shortest path for this path length. The execution of the tree-structured queries are stopped, and the next path length iteration is started. Otherwise, every tree-structured query is executed and their result set is stored.

When combining all the result sets $[E_1, \ldots, E_l]$, the complete list of shortest paths may be generated by using a Depth-First Search strategy. Starting from a node u, adjacent edges are retrieved from the result set $E_1$ by looking up the node identifier in the source column. The identifiers of the neighbor nodes are retrieved using the target column. The set of target node identifiers are then used to find adjacent edges from $E_2$ by looking up their identifier in the source column, and so on.

For example, in one embodiment the result sets $[E_1, \ldots, E_l]$ are stored as individual tables with index on the source column for fast lookups. In another embodiment, the result sets $[E_1, \ldots, E_l]$ are loaded into individual in-memory hash table using the source column as hash key for fast in-memory lookups.

The size complexity of one result set $E_k$ is bounded by the number of edges |E|. Therefore, the size complexity of all the result sets is linear with the number of edges |E|, as compared to exponential with the original sequence of joins technique.

The number of semi-joins to execute across all the tree-structured queries is higher than the number of joins in the associated sequence of joins. For a sequence of l−1 joins, there will be l tree-structured queries of l−1 semi-joins which brings the number of semi-joins to be executed to a quadratic complexity compared to a linear complexity with the sequence of joins.

However, the overall complexity may be reduced by caching the result set of a semi-join operation. As discussed previously, the size complexity of a result set of a semi-join is linear with the number of edges |E| which is appropriate for efficient caching. In an embodiment, the result set of a semi-join comprising a list of edges may be cached very efficiently. For example, in one embodiment a result set may be encoded and cached by storing the row identifiers of the corresponding edges in a bit array.

After doing a permutation of the projected variable, all the semi-join operations apart from one are identical to the ones found in the original query before the permutation. The query planner may verify in the cache storage if the result set of a given semi-join operation is stored. If the result set for a semi-join operation is cached, the query planner may use the cached result set and may skip the execution of the semi-join operation. The query planner may repeat the same logic for every semi-join operation. The final query plan produced by the query planner may consist of one single semi-join operation, in which all the other semi-join operations were replaced by a cached result set.

Figure 8:
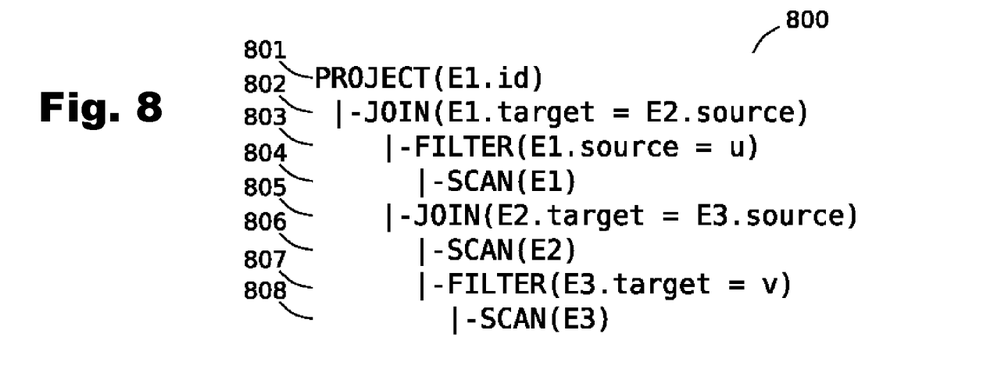
FIG. 8 is a query plan for the tree-structured query sequence of FIG. 5.

For example, FIG. 8 depicts a query plan 800 for the first tree-structured query 500. The query plan consists in two semi-join operations, 802 and 805 respectively, and produces 801 a set of edges $E_1$. The query plan may be executed as follows. The table $E_3$ is scanned 808 to produce a stream of records. The records are filtered 807 by the predicate $E_3$.target=v. The filtered records are then joined 805 with a second stream of records from a scan of $E_2$ 806. The result set of the semi-join 805 is joined 802 with a stream of filtered records from a scan 804 of the table $E_1$, where the records are filtered 803 by the predicate $E_1$.source=u.

Figure 9:
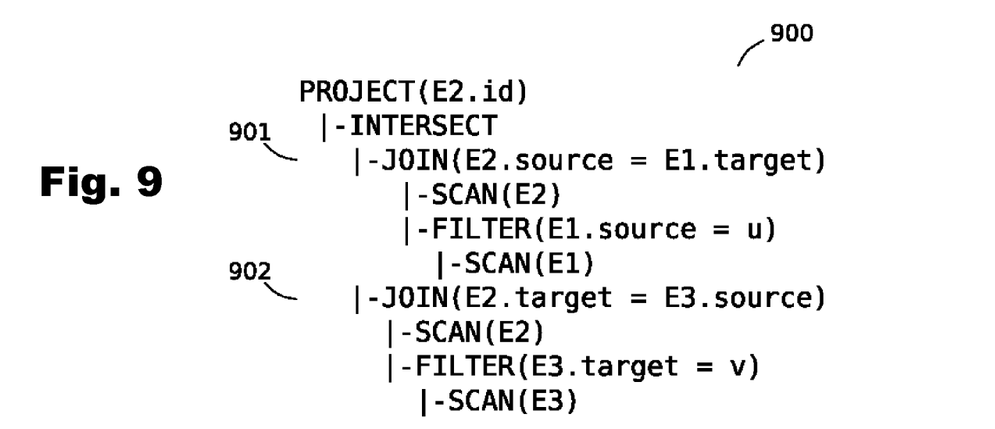
FIG. 9 is a query plan for the tree-structured query sequence of FIG. 6.

FIG. 9 depicts a query plan 900 for the second tree-structured query 600. The semi-join operation 902 is equivalent to the semi-join operation 805, as they are producing the same result set. If the result set for the semi-join operation 805 is stored in the cache storage, the query planner may rewrite the query plan by replacing the semi-join operation with a scan operation of the cached result set. In that scenario, the final query plan may consist in one single semi-join 901.

Figure 10:
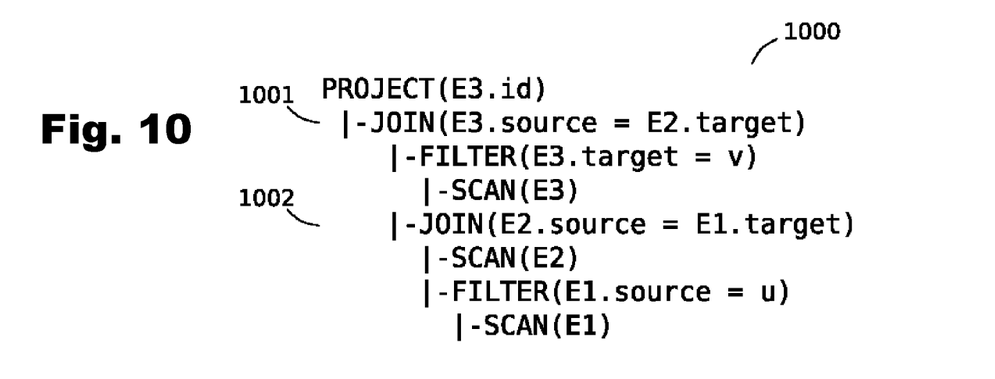
FIG. 10 is a query plan for the tree-structured query sequence of FIG. 7.

FIG. 10 depicts a query plan 1000 for the third tree-structured query 700. The semi-join operation 1002 is equivalent to the semi-join operation 901, as they are producing the same result set. If the result set for the semi-join operation 901 is stored in the cache storage, the query planner may rewrite the query plan by replacing the semi-join operation with a scan operation of the cached result set. In that scenario, the final query plan may consist in one single semi-join 1001.

The number of semi-joins to compute can then be reduced to l–1 semi-joins for the first query, then 1 semi-join for the l–1 remaining queries. The total number of semi-joins to be computed is therefore $(l-1)+(l-1)=2*(l-1)$ which is linear.

While we are still executing twice as many semi-joins as there are joins in the original sequence of joins 400, a semi-join is likely to be much cheaper to compute (fewer data exchange across the network, smaller memory footprint, faster join algorithm) than a traditional join. In addition, the semi-join result set is linear with the number of edges while the result set of a join is exponential. This entails that more there are joins in a sequence, more a join is costly to compute.

When taking into consideration the iterative execution of the queries with an increasing path length, until a path of length l is found, the sequence of joins technique is executing l–1 joins, which sums up to $((l-1)^2+(l-1))/2$ joins.

Figure 11:
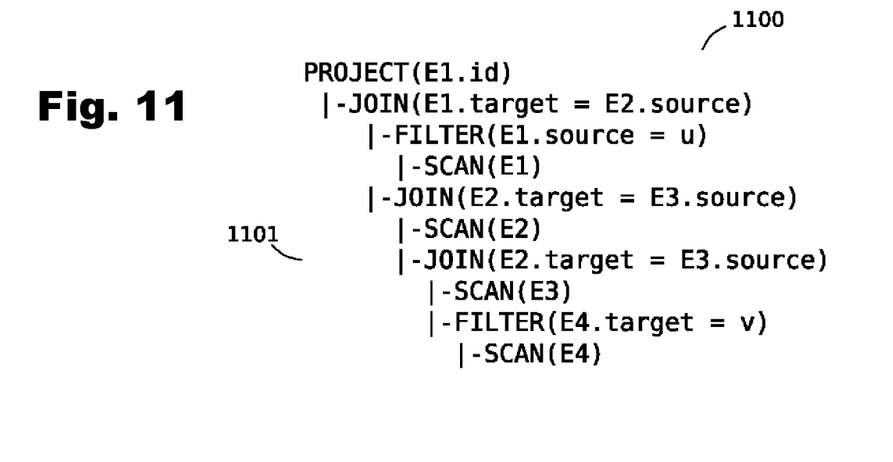
FIG. 11 is a query plan for a tree-structured query for a path of length 4.

However, semi-joins across iterations may be cached. At each iteration the reachability test may be performed by computing a maximum of two semi-join operations, and by reusing the cached result sets of the other semi-joins that were computed at the previous iterations. For example, FIG. 11 depicts a query plan 1100 of the reachability test query for a path of length 4. The semi-join operation 1101 is equivalent to the semi-join operation 805, as they are producing the same result set. If the result set for the semi-join operation 805 is stored in the cache storage, the query planner may rewrite the query plan by replacing the semi-join operation with a scan operation of the cached result set.

Therefore, the number of semi-joins to perform the reachability tests until a path length of l is found is $2*(l-1)$ semi-joins. Once the reachability test is positive, the (l–1) remaining queries is executed by computing one semi-join operation for each query. Overall the complexity for the sequence of joins is $((l-1)^2+(l-1))/2$ and for our technique is $3*(l-1)$.

In practical terms, this means that for a path of length l=3, the sequence of joins will have to execute a total of 3 joins, while our technique will execute 6 semi-joins. With a path of length l=4, the sequence of joins will have to execute a total of 6 joins, while our technique will execute 9 semi-joins. With a path of length l=5, the sequence of joins will have to execute a total of 10 joins, while our technique will execute 12 semi-joins. At a path length of l=6, the semi-join decomposition in combination with a semi-join caching mechanism is executing fewer joins in total. These examples are indicative of the complexity in terms of number of joins between the two approaches. In another embodiment, other query plan optimization such as filter and join reordering, and execution strategies such as the order in which the tree-structured queries are executed, may increase the cache hits and may reduce the number of joins to be executed.

Figure 12:
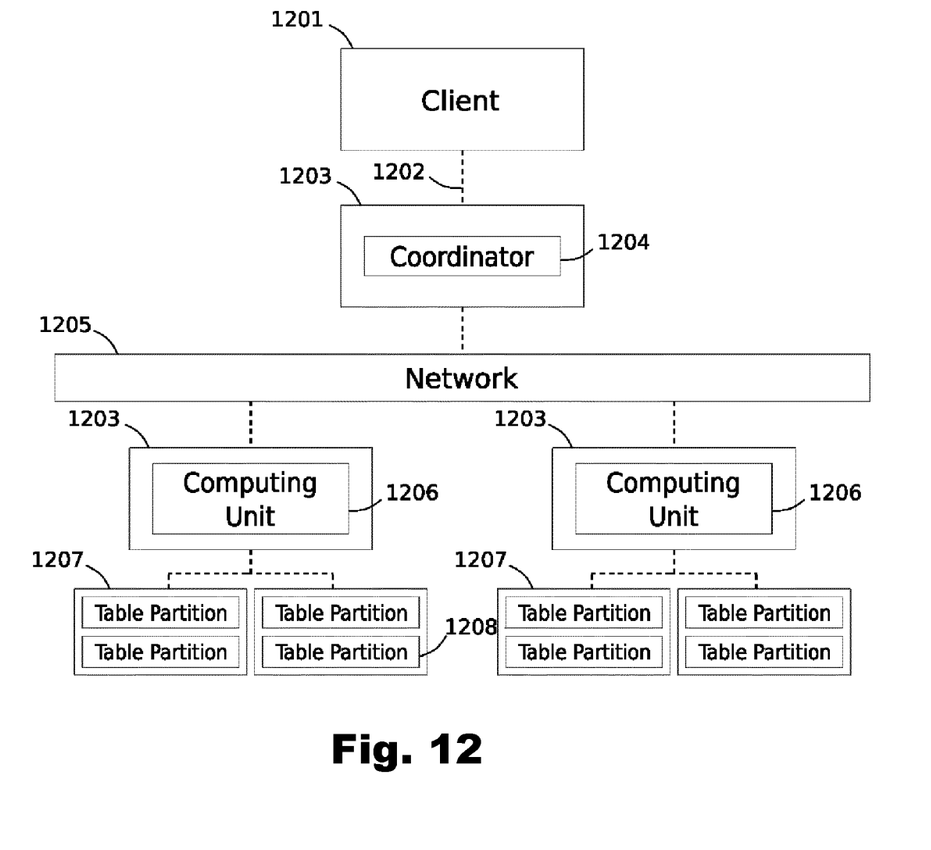
FIG. 12 is a block diagram of a system for determining a shortest path in a database.

The present disclosure may be implemented as a system, a method, and/or a computer program product. FIG. 12 illustrates an exemplary computer system, according to an embodiment of the present disclosure. The computer system comprises one or more nodes 1203. A node is a database system process which includes computer-readable program instructions to carry out aspects of the present disclosure. For example, a node may include instructions to carry out the necessary functions of a coordinator 1204 or of a computing unit 1206. Nodes may be interconnected by a network 1205. One or more computer-readable storage medium 1207 may be attached to a computing unit node. One or more data or join index table partitions 1208 may be stored on a computer-readable storage medium. A computing unit node may carry out various functions such as but not limited to scanning table partitions, transferring data to other computing unit nodes, executing join operations. A client 1201 may interact with the computer system through the coordinator node by sending a query 1102.

Figure 13:
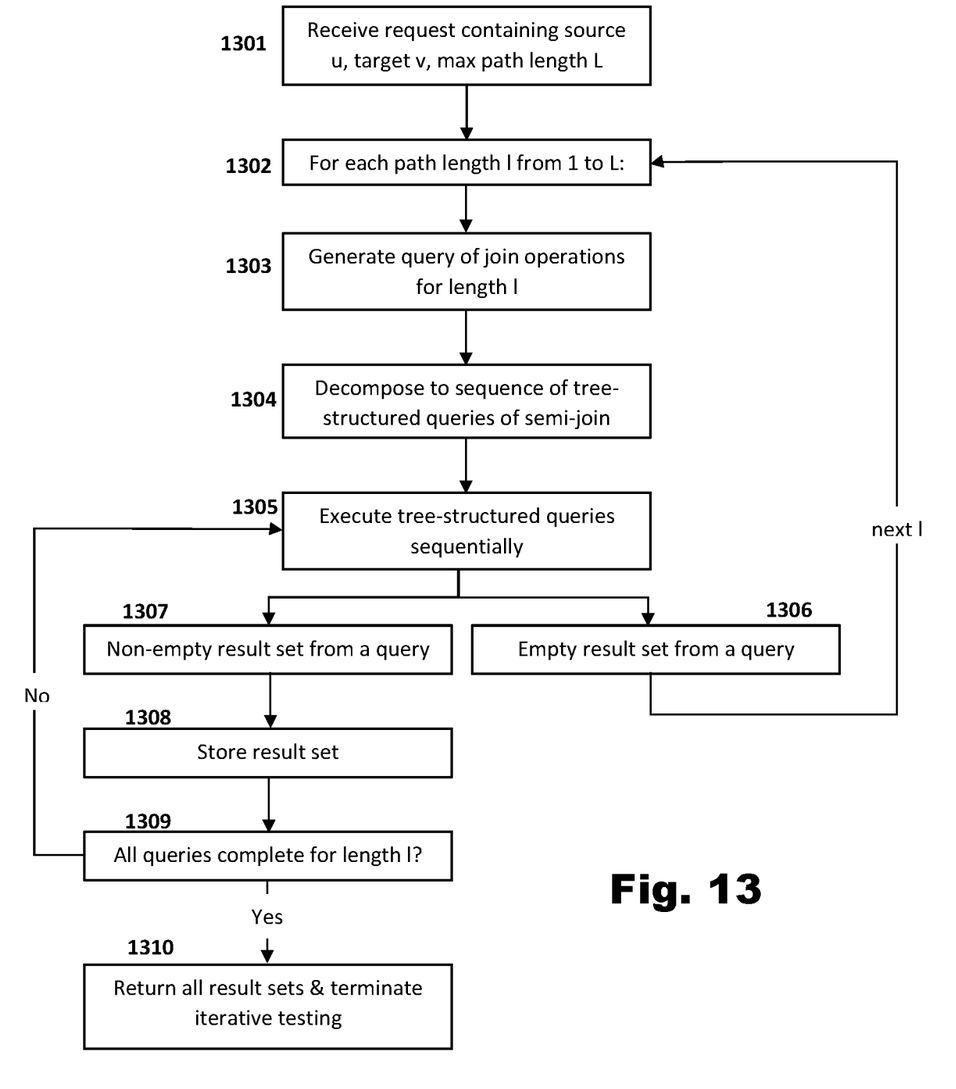
FIG. 13 is a flowchart of the operation of a method for finding shortest paths in a relational database.

FIG. 13 is a flowchart of the operation of a method for finding shortest paths in a relation database, described for a single source u and target v, but this can be extended as described previously to a set of source nodes and/or a set of target nodes.

In step 1301 a request is received identifying a source node, target node and maximum path length L. In step 1302 an iterative loop is initialized for a variable l for increasing values from 1 to L. For each path length l, in step 1303 a sequence of join operations is generated. In step 1304 the query planner decomposes the sequence of join operations to a sequence of tree-structured queries composed of semi-join operations, such that each of the tree-structured queries will return all edges at a given step along path 1 for all shortest paths, if such shortest paths exist.

In step 1305, the tree structured queries are executed sequentially in turn. If a tree-structured query returns an empty result set, step 1306, the current iteration is terminated and the iterative evaluation is advanced to the next value of l, returning operation to step 1302 and increasing the variable l by 1. If a tree-structured query returns a non-empty result set, step 1307, the result set is stored in step 1308, and a check is made in step 1309 to determine if all of the tree-structured queries for the current path length l are complete.

If there are still tree-structured queries to evaluate (branch "No") then the evaluation of the tree-structured queries continues in step 1305. If all of the tree-structured queries are complete (branch "Yes") then the result sets generated for the current path length are returned and the iterative testing terminates. From those result sets, each of which is a list of edges at a different step along the shortest paths from 1 to l, the shortest paths can be constructed.

Figure 14:
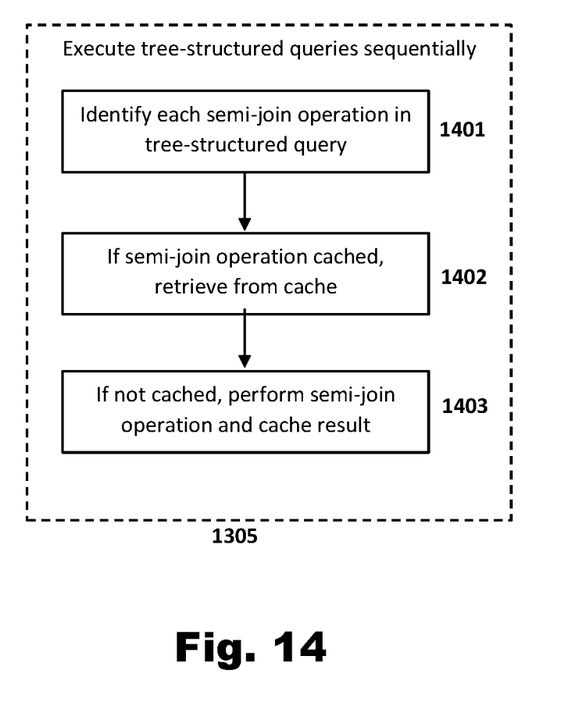
FIG. 14 is a flowchart of the execution of tree-structured queries making use of cached results.

In FIG. 14, the use of caching makes the evaluation of the tree-structured queries in step 1305 more efficient. A given tree-structured query is composed of a plurality of semi-join operations, some of which may be common to earlier iterations. Accordingly, in step 1401, each semi-join operation in the tree-structured query is identified. In step 1402, a check is made, using a unique identifier, whether the result for each semi-join operation has been cached previously, and if so the result is retrieved from the cache. If not already cached, step 1403, the semi-join is evaluated and the result cached for later use if the same semi-join operation is called again.

The computer program product may include a computer-readable storage medium (or media) having computer-readable program instructions thereon for causing a processor to carry out aspects of the present disclosure. Examples of computer-readable storage medium include, but are not limited to: magnetic media such as hard disks, floppy disks and magnetic tape; optical media such as CD-ROMs and DVDs; and hardware devices such as ROM or RAM. Examples of computer-readable program instructions include machine instructions such as produced by a compiler and higher-level instructions that are interpreted by another computer program.

Any database system which can be for example key-value stores, document stores, graph stores or columnar data stores that perform join operations, may benefit from the present disclosure. In particular, the present disclosure can be beneficial for data analytics platforms based on such database systems in domains including but not limited to business intelligence, operational intelligence, data investigation, security information and event management, log analysis, and so on. For example, the present disclosure may be leveraged in data investigation platforms to find and display all shortest paths between two records or two set of records.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

The present disclosure is not limited to the embodiment(s) described herein but can be amended or modified without departing from the scope of the present disclosure. Additionally, it will be appreciated that in embodiments of the present disclosure some of the above-described steps may be omitted and/or performed in an order other than that described.

Similarly, the words comprises/comprising when used in the specification are used to specify the presence of stated features, integers, steps, or components but do not preclude the presence or addition of one or more additional features, integers, steps, components, or groups thereof.

What is claimed is:

1. A method for performing an operation on a relational database comprising a plurality of records represented in one or more tables, to return a set of paths from a source node identified in one of said records to a target node identified in another of said records, with records of the database identifying edges between pairs of connected nodes, and wherein each of the returned path is a shortest path through said records from the source node to the target node, the method comprising:
    a. receiving a request specifying a source node u, a target node v, and a maximum path length L;
    b. iteratively testing each path length l from 1 to L, wherein testing a path length l comprises:
        1. generating a query comprising a sequence of database join operations for the path length l which connect the source node u to the target node v;
        2. generating a sequence of one or more tree-structured queries comprising semi-join operations of said database, said sequence of tree-structured queries representing a decomposition of said sequence of join operations;
        3. executing the semi-join operations of each tree-structured query for the path length l, wherein each tree-structured query returns either an empty result set or a non-empty result set, a non-empty result set comprising a set of edges representing a path through the database records from the source node u to the target node v;
        4. in the event that any of the tree-structured queries for the path length l returns an empty result set, terminating the execution of semi-join operations for the path length l and advancing the iteration to the next path length l+1;
        5. in the event that all of the tree-structured queries for the path length l return non-empty result sets, terminating the iterative testing procedure and storing the non-empty result sets for the path length l; and
    c. returning the shortest path(s) specified in the, or each, stored result set for the path length l at which the iterative testing terminated;
    wherein step (iii) of executing the semi join operations of each tree-structured query for the path length l comprises determining, for a semi join operation of the tree-structured query, whether the result of that semi-join operation is stored in a cache from a preceding tree-structured query for the path length l or from a tree-structured query from a preceding path length k where $1 \leq k < l$, and:
    if the determination is positive, retrieving the result from the cache without repeating the semi-join operation; or
    if the determination is negative, performing the semi-join operation and storing the result thereof in said cache.

2. The method of claim 1, further comprising returning a null result if the iterative testing of all path lengths from 1 to L generate a non-empty result set.

3. The method of claim 1 wherein said request specifies a plurality of source nodes and/or a plurality of target nodes, and wherein steps (b) and (c) are repeated by generating a query comprising a sequence of join operations between a plurality of source nodes and a plurality of target nodes.

4. The method of claim 1, wherein the step of generating a sequence of one or more tree-structured queries comprising semi join operations comprises:
    d. generating a permutation of the projected variable representing edges $E_k$ at position k in the ordered list of edges $E_i, \ldots, E_l$ of paths of length l;and
    e. rewriting the query to compute every list of edges $E_i, \ldots, E_l$.

5. The method of claim 2, wherein the step of generating a sequence of one or more tree-structured queries comprising semi-join operations comprises:
    f. generating a permutation of the projected variable representing edges $E_k$ at position k in the ordered list of edges $E_i, \ldots, E_l$ of paths of length l;and
    g. rewriting the query to compute every list of edges $E_i, \ldots, E_l$.

6. The method of claim 1 wherein the results of a tree-structured query is a set of all edges $E_k$ at step k of each shortest path of length l where $1 \leq k \leq l$.

7. The method of claim 6, wherein when all of the tree-structured queries for a path length l return non-empty result sets, each of the non-empty result sets represents all of the edges at a particular step along each of the shortest paths of length l.

8. The method of claim 1, wherein results stored in the cache are stored as result sets indexed using an identifier derived from the signature of the semi-join operation.

9. The method of claim 2 wherein results stored in the cache are stored as result sets indexed using an identifier derived from the signature of the semi-join operation.

10. The method of claim 3 wherein results stored in the cache are stored as result sets indexed using an identifier derived from the signature of the semi join operation.

11. The method of claim 1 wherein results stored in the cache are encoded by storing row identifiers of edges in the set of results in a bit array, permitting a look-up operation to retrieve row identifiers of the edges forming the result set for a given semi-join operation.

12. The method of claim 2 wherein results stored in the cache are encoded by storing row identifiers of edges in the set of results in a bit array, permitting a look-up operation to retrieve row identifiers of the edges forming the result set for a given semi-join operation.

13. The method of claim 3 wherein results stored in the cache are encoded by storing row identifiers of edges in the set of results in a bit array, permitting a look-up operation to retrieve row identifiers of the edges forming the result set for a given semi-join operation.

14. The method of claim 1 wherein the cache is maintained across successive iterations of increasing path length, such that the results of a semi-join operation computed as a decomposition of a first sequence of join operations of path length l1 are retrieved during a later iteration of path length l2, where l2>l1.

15. The method of claim 2 wherein the cache is maintained across successive iterations of increasing path length, such that the results of a semi-join operation computed as a decomposition of a first sequence of join operations of path length l1 are retrieved during a later iteration of path length l2, where l2>l1.

16. The method of claim 3 wherein the cache is maintained across successive iterations of increasing path length, such that the results of a semi-join operation computed as a decomposition of a first sequence of join operations of path length l1 are retrieved during a later iteration of path length l2, where l2>l1.

17. The method of claim 1 further comprising the step of generating a query plan for each tree-structured query, the query plan specifying the tree-structured query as a combination of semi-join operations and cached result retrievals.

18. The method claim 2 further comprising the step of generating a query plan for each tree-structured query, the query plan specifying the tree-structured query as a combination of semi-join operations and cached result retrievals.

19. A computer program product comprising a non-transitory computer readable medium having instructions stored thereon which when executed in a processor of a computing system are effective to cause said system to perform the method of claim 1.

20. A system for performing an operation on a relational database comprising a plurality of records represented in one or more tables, to return a set of paths from a source node identified in one of said records to a target node identified in another of said records, with records of the database identifying edges between pairs of connected nodes, and wherein each of the returned path is a shortest path through said records from the source node to the target node, the system comprising a processor programmed to:
  a. receive a request specifying a source node u, a target node v, and a maximum path length L;
  b. iteratively test each path length l from 1 to L, wherein testing a path length l comprises:
    1. generating a query comprising a sequence of join operations for the path length l which connect the source node u to the target node v;
    2. generating a sequence of one or more tree-structured queries comprising semi-join operations of said database, said sequence of tree-structured queries representing a decomposition of said sequence of join operations;
    3. executing the semi-join operations of each tree-structured query for the path length l, wherein each tree-structured query returns either an empty result set or a non-empty result set, a non-empty result set comprising a set of edges representing a path through the database records from the source node u to the target node v;
    4. in the event that any of the tree-structured queries for the path length l returns an empty result set, terminating the execution of semi join operations for the path length l and advancing the iteration to the next path length l+1;
    5. in the event that all of the tree-structured queries for the path length l return non-empty result sets, terminating the iterative testing procedure and storing the non-empty result sets for the path length l; and
  c. return the shortest path(s) specified in the, or each, stored result set for the path length 1 at which the iterative testing terminated;
wherein step (iii) of executing the semi-join operations of each tree-structured query for the path length l comprises determining, for a semi-join operation of the tree-structured query, whether the result of that semi-join operation is stored in a cache from a preceding tree-structured query for the path length l or from a tree-structured query from a preceding path length k where $1 \leq k \leq l$ and:
  if the determination is positive, retrieving the result from the cache without repeating the semi-join operation; or
  if the determination is negative, performing the semi-join operation and storing the result thereof in said cache.

* * * * *

UNITED STATES PATENT AND TRADEMARK OFFICE
CERTIFICATE OF CORRECTION

PATENT NO. : 11,720,564 B2  
APPLICATION NO. : 17/939525  
DATED : August 8, 2023  
INVENTOR(S) : Daniele Pini et al.

Page 1 of 1

It is certified that error appears in the above-identified patent and that said Letters Patent is hereby corrected as shown below:

On the Title Page

Inventor:
"Giovanni Tumarello" should be -- Giovanni Tummarello --

Signed and Sealed this
Seventeenth Day of December, 2024

Derrick Brent
*Acting Director of the United States Patent and Trademark Office*